United States Patent
Schenk

(10) Patent No.: US 6,176,641 B1
(45) Date of Patent: Jan. 23, 2001

(54) QUICK LOCKING AND RELEASE ATTACHMENT ELEMENT

(76) Inventor: Noel J. Schenk, 113 S. Grove Ave., Oak Park, IL (US) 60302

(*) Notice: Under 35 U.S.C. 154(b), the term of this patent shall be extended for 0 days.

(21) Appl. No.: 09/221,613

(22) Filed: Dec. 28, 1998

(51) Int. Cl.$^7$ .................................................. A47B 96/06
(52) U.S. Cl. ................ 403/381; 403/373; 403/374.5; 248/223.41
(58) Field of Search .................... 403/381, 373, 403/374.1, 374.5, 409.1; 248/224.51, 223.41

(56) References Cited

U.S. PATENT DOCUMENTS

| | | |
|---|---|---|
| 171,853 | 1/1876 | Porter . |
| 207,055 | 8/1878 | McIntyre . |
| 967,608 | 8/1910 | Bremaker et al. . |
| 2,674,431 * | 4/1954 | Attwood ...................... 248/223.41 X |
| 2,856,214 * | 10/1958 | Schrimshaw ......................... 403/373 |
| 3,106,117 | 10/1963 | Duquesnel ............................... 82/32 |
| 3,243,153 * | 3/1966 | Kelly et al. ................. 248/223.41 X |
| 3,498,685 | 3/1970 | Poplinski ................................. 308/3 |
| 3,756,637 * | 9/1973 | Wildi ................................ 403/381 X |
| 3,787,132 | 1/1974 | Garnett .................................. 403/290 |
| 4,057,294 * | 11/1977 | Krekeler ........................... 403/381 X |
| 4,270,310 * | 6/1981 | Fischer ........................ 403/409.1 X |
| 4,300,271 | 11/1981 | Wohlhaupter ........................... 29/1 A |
| 4,369,945 * | 1/1983 | Mantoan et al. ............. 248/223.41 X |
| 4,746,242 * | 5/1988 | Mischenko ............................. 403/373 |
| 4,941,758 | 7/1990 | Osawa ..................................... 384/40 |
| 5,240,213 * | 8/1993 | Horcher .......................... 248/223.41 |
| 5,551,795 * | 9/1996 | Engibarov ............................. 403/381 |
| 5,598,785 * | 2/1997 | Zaguroli, Jr. ................ 248/223.41 X |
| 5,762,441 * | 6/1998 | Karlsen et al. ....................... 403/381 |

* cited by examiner

*Primary Examiner*—Lynne H. Browne
*Assistant Examiner*—David E. Bochna
(74) *Attorney, Agent, or Firm*—Joan I. Norek; The Law Office of Joan I. Norek

(57) ABSTRACT

An attachment element for mounting or otherwise securing an ancillary device to the vicinity of a machine tool or the like provides quick locking/release on a dovetail element. The attachment member has a base member and a pair of spaced arms forming an open-mouthed way that slides over such a dovetail member. At a locking angle relative to the dovetail, the edges of the arms bear against the dovetail sides, and the edges of the distal ends of the arms bear against the surface from which the dovetail extends. That locking angle is less than 90° angle between the plane of the attachment element and the surface from which the dovetail extends. The attachment element is translatable from its locked orientation to a release orientation by a brief application of manual pressure on it.

15 Claims, 3 Drawing Sheets

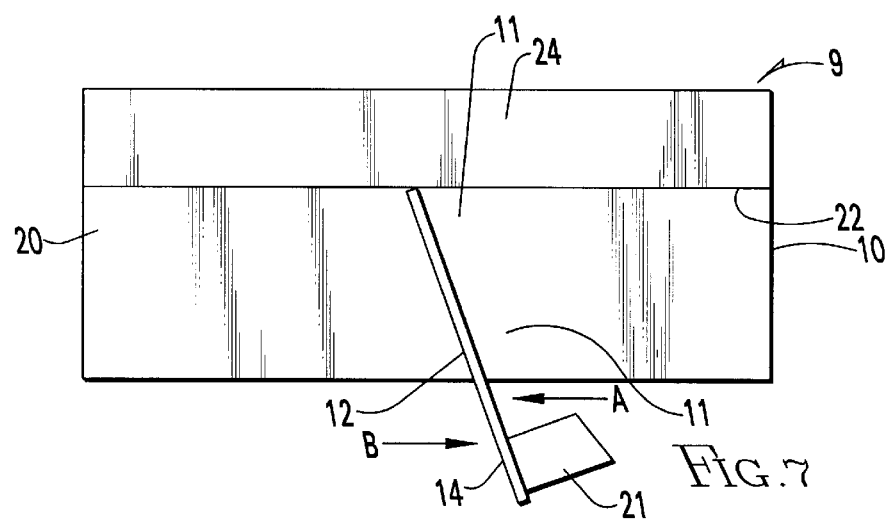
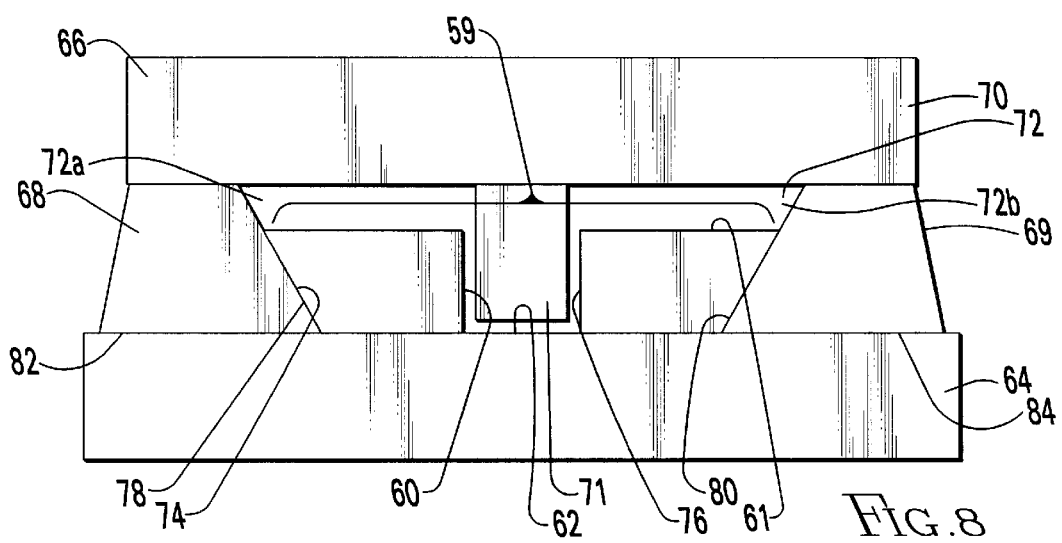

QUICK LOCKING AND RELEASE ATTACHMENT ELEMENT

BACKGROUND OF THE INVENTION

In machine shops or machine tool establishments ancillary devices, such as work lights, instruments, add-on components and the like, are often used in association with various machine tools. It is generally desirable to have such an ancillary device stationarily mounted in a convenient location in the vicinity of the machine tool when it is needed, while having the option of moving it out of the way. Conventional mechanical fasteners or other mounting means, such as screws, bolts, clamps and the like, entail installation time and expense. Moreover, when conventional mechanical fasteners or other mounting means are employed, ancillary devices cannot be installed, or repositioned, or removed rapidly.

A dovetail is a well known means for joining one article to another in a tongue-in-groove fashion. "Dovetail" is a commonly-used term for both the male element (typically a flared dovetail member together with its associated structure) and for the joint formed by a male dovetail element in combination with a mating female element. (It is of course the structure attached to the male and female members of the dovetail joint that are connected by the joint.) Also known is a type of male dovetail element that is comprised of an elongate platform or body member from which a single elongate male dovetail member projects. Such a male dovetail element often can be mounted or otherwise positioned with an exposed section, for instance by sliding it partly into a matching open-ended guide-way, but it will not provide a site for easy and rapid fixed attachment and detachment of ancillary devices if used with conventional mechanical fasteners. An attachment device that can be readily mounted on such a male dovetail element, and quickly locked thereon and released therefrom, will provide a highly advantageous arrangement for the attachment of ancillary devices to, or in the vicinity of, machine tools and other equipment. An ancillary device could then be simply and quickly connected to the male dovetail element, positioned or repositioned thereon, locked into place, and then simply and quickly detached. Such an attachment means would be far preferable in many circumstances to conventional mechanical fasteners when it is desirable to attach an ancillary device.

BRIEF SUMMARY OF THE INVENTION

The present invention is an attachment element for mounting or otherwise securing an ancillary device to the vicinity of a machine tool or the like provides quick locking/release on a dovetail element. The attachment member has a base member and a pair of spaced arms forming an open-mouthed way that slides over such a dovetail member. At a locking angle relative to the dovetail, the edges of the arms bear against the dovetail sides, and the edges of the distal ends of the arms bear against the surface from which the dovetail extends. That locking angle is a less-than-90° angle between the plane of the attachment element and the surface from which the dovetail extends. The attachment element is translatable from its locked orientation to a release orientation by a brief application of manual pressure on it.

The present invention also is an attachment apparatus comprising a dovetail and such an attachment element. The present invention also is an ancillary attachment assemblage comprising a dovetail, such an attachment element and an ancillary device.

The present invention permits ancillary devices to be installed, and repositioned, and removed rapidly.

BRIEF DESCRIPTION OF THE SEVERAL VIEWS OF THE DRAWING

FIG. 7 is a partially diagrammatic side view of the attachment element of FIG. 1 on the dovetail element of FIG. 1, further including an attached ancillary device; and FIG. 8 is a partially diagrammatic elevated end view of an attachment element of the invention plus ancillary device in the locked position on a split dovetail element.

DETAILED DESCRIPTION OF THE INVENTION

Figure 1:
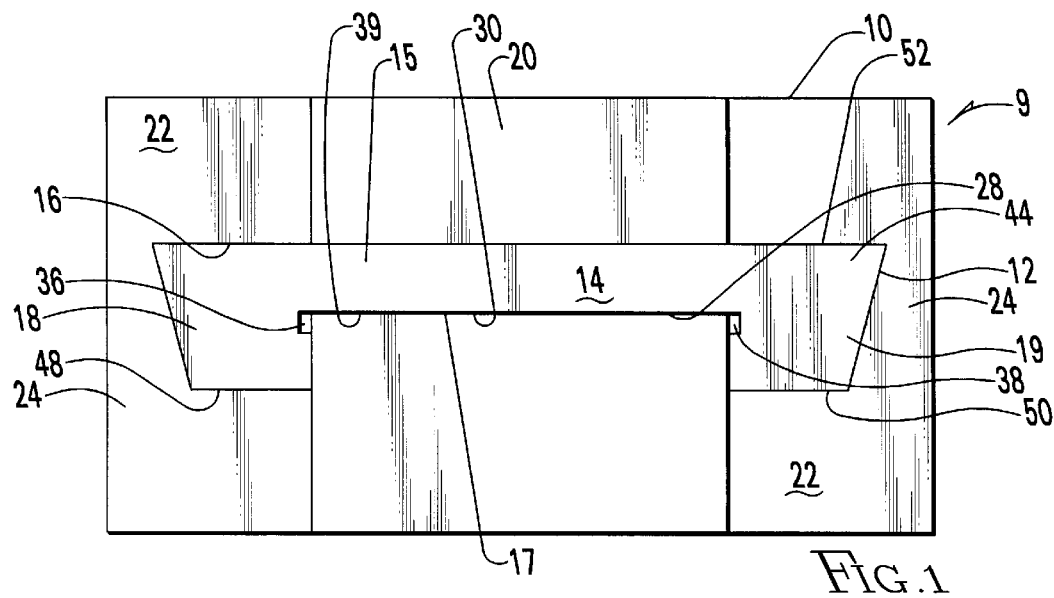
FIG. 1 is a bottom plan view of an attachment element of the invention in the release position on a dovetail element.

Referring to FIGS. 1 through 7, an elongate male dovetail element 10 is shown in combination with an attachment element 12, which together comprise an attachment apparatus 9. The male dovetail element 10 is comprised of a single elongate flared tongue or male dovetail member 20, the flared or dove-tail-like configuration being best discerned by its end profile, and a body member 24. The male dovetail member 20 extends or projects from a face 22 of the body member 24, that is, the surface from which the male dovetail member 20 emanates. The attachment element 12 as shown is a sheet metal attachment element that has been slid onto the male dovetail member 20. The attachment element 12 includes, forms and/or defines an open-mouthed collar region or way 28.

Figure 2:
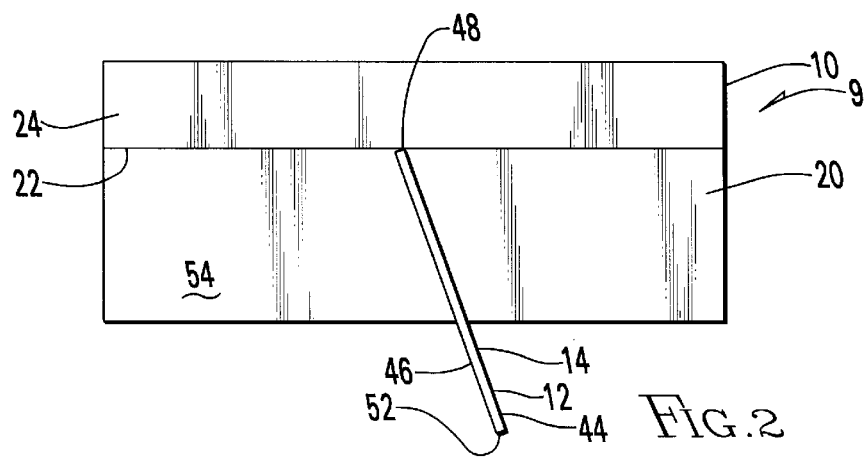
FIG. 2 is an elevated side view of the attachment element of FIG. 1 in the release position on the dovetail element of FIG. 1.
Figure 3:
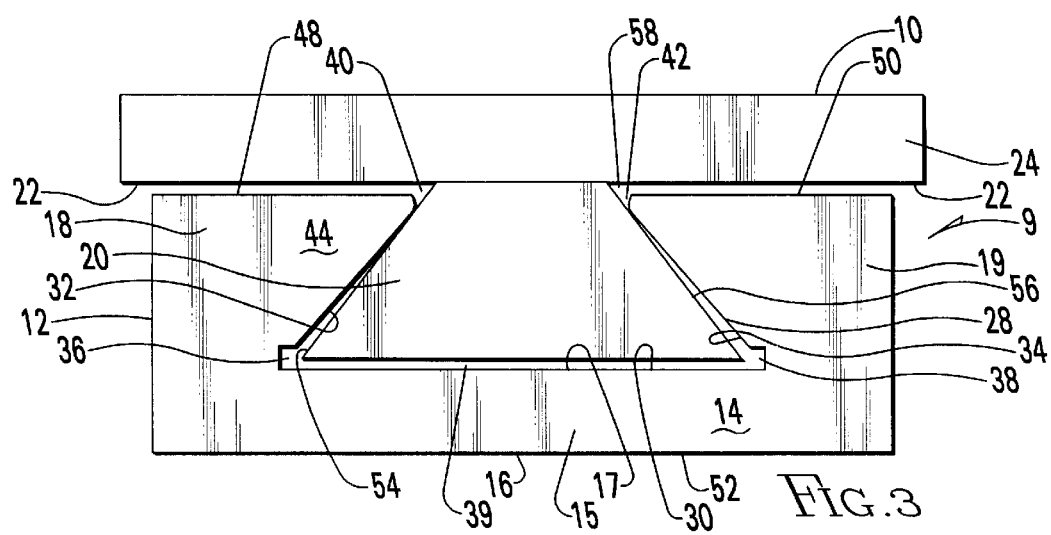
FIG. 3 is an elevated end view of the attachment element of FIG. 1 in the release position on the dovetail element of FIG. 1.
Figure 4:
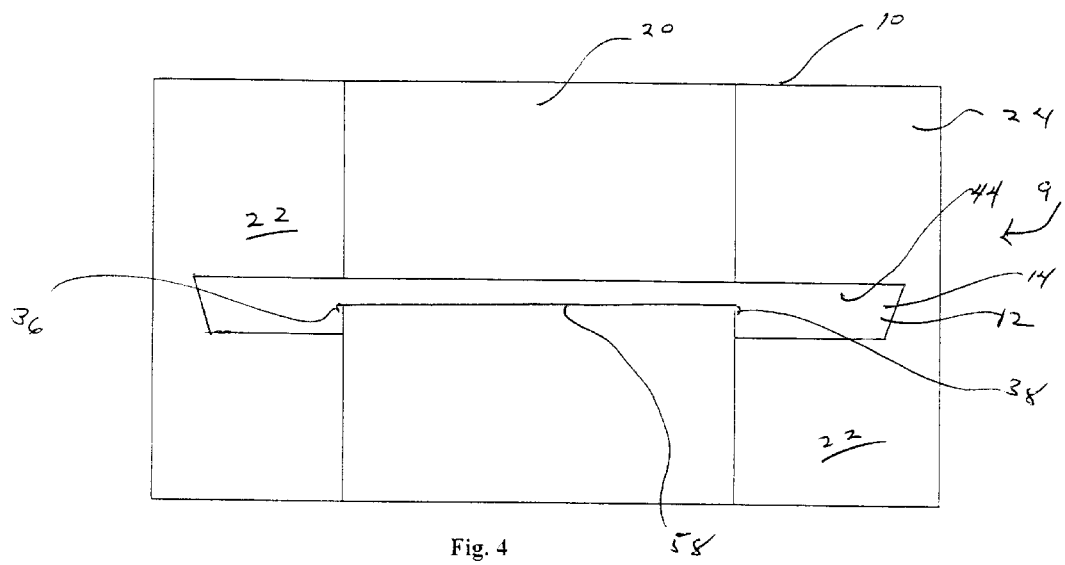
FIG. 4 is a bottom plan view of the attachment element of FIG. 1 in the lock-on position on the dovetail element of FIG. 1.
Figure 5:
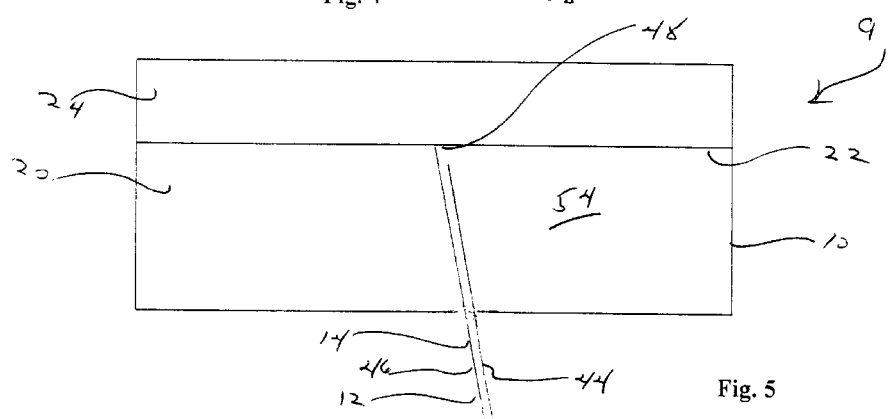
FIG. 5 is an elevated side view of the attachment element of FIG. 1 in the lock-on position on the dovetail element of FIG. 1.
Figure 6:
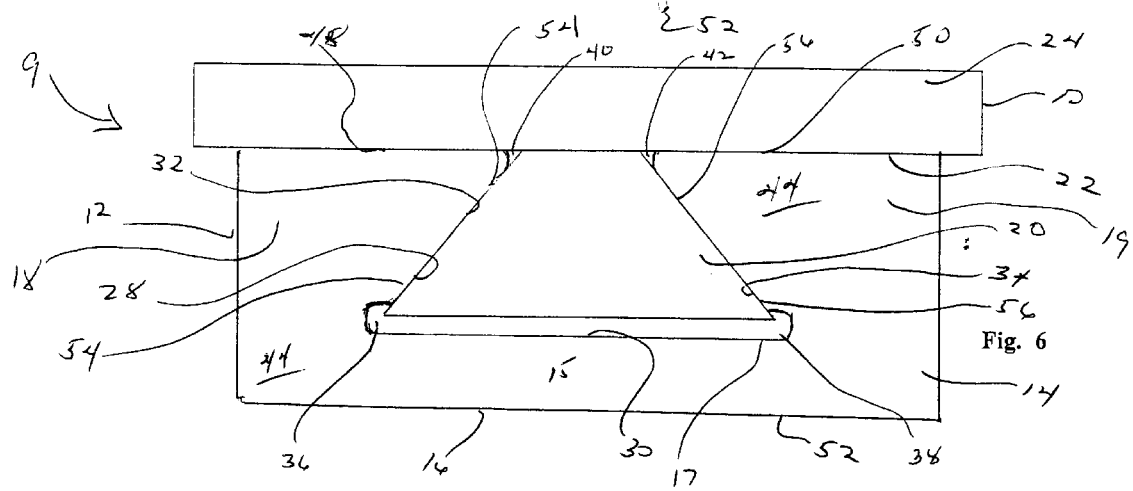
FIG. 6 is an elevated end view of the attachment element of FIG. 1 in the release position on the dovetail element of FIG. 1.

The attachment element 12 is movable or translatable from a release or unrestrained position or orientation, which release orientation is shown in FIGS. 1 through 3, to a constrained, locked or lock-on position or orientation as shown in FIGS. 4 through 6. The attachment element 12 can be simply and quickly released from its lock-on orientation, as described in more detail below. The quick locking and release operations of the attachment element 12 are derived in considerable part from the configuration of the way 28. The way 28 thus can be regarded as a locking/release way.

The way 28 as shown has a substantially straight remote (bottom) verge or edge 30 and two flanking or opposed side edges 32, 34 running or extending from the opposite sides of the remote edge 30 to a way mouth 58. The side edges 32, 34 are each substantially straight and obliquely inclined along opposite angles. There are remote corner clearance or margin areas 36, 38 at the junctures of the remote edge 30 with the side edges 32, 34, which clearance areas can be considered portions of a single, U-shaped remote clearance or margin 39. There are also inner corner clearances 40, 42 at the junctures of the side edges 32, 34 with adjacent inner or bearing edges 48, 50 of the attachment element 12. The corner clearances 36, 38, 40, 42 are manufacturing conveniences.

The attachment element 12 as shown would be a substantially rectangular piece except for the gap or discontinuity that is the way 28. As shown, the attachment element 12 is formed with a plate-like relative thinness, and it is substantially flat on both planar sides 44, 46. The inner or bearing edges 48, 50 of the attachment element 12 are substantially straight and in substantial linear co-alignment. The bearing edges 48, 50 thus would form a continuous straight edge except, of course, that the continuity of such hypothetical edge is interrupted by the mouth 58 of the way 28.

As shown, the attachment element 12 has a substantially straight bottom or outside edge 52, but such configuration is at least partly selected for illustration because of its simplicity. The outlying material or expanse 14 of the attachment element 12 beyond the way 28 is available for connection to an ancillary device (which, for simplicity, is shown in FIG. 7 but not shown in FIGS. 1 through 6), whereby such an ancillary device is mounted adjacent or close by the body member 24.

The body member 24 can be the body member or portion of a detachable male dovetail element, or instead a component or section of a machine tool or other device from which the male dovetail member 20 extends.

In its unrestrained orientation (see particularly FIGS. 1 through 3) the attachment element 12 can slide or slip on the male dovetail element 10. When totally at rest, the contact between the attachment element 12 and the male dovetail element 10 is only along short sections of the way's side edges 32, 34 adjacent the inner corner clearances 40, 42 which touch the male dovetail member 20. These contact sections at least approach being point contacts. The attachment element 12 is essentially hanging off of the male dovetail member 20 at these short contact sections. (When the attachment element 12 is at rest, and positioned as shown hanging off the male dovetail member 20 below the body member 24, its position is, of course, partly due to gravity.) There are slight clearances between the body member 24 of the male dovetail element 10 and the attachment element's bearing or contact edges 48, 50. There are also slight clearances between the male dovetail member 20 and the side edges 32, 34 below the contacting sections. There is a more conspicuous clearance between the male dovetail member 20 and the way's remote edge 30. These clearances permit a limited degree of free pivotal motion. The attachment element 12 can be swung slightly towards the body face 22, for instance in an arc of about 4 or 5° to a position having less or no contact with the male dovetail member 20, and thereat moved relatively freely on or along the length of the male dovetail element 10.

In its unrestrained orientation, as shown in FIGS. 1 through 3, the attachment element 12 is offset from a right angled or normal position relative to the body face 22. The (smaller) angle between the planes of the attachment element 12 and body face 22 is within a range of angles that are greater than 0° but less than 90°. As shown, the angle between these planes is approximately 70°. (As noted above, there is at least about a 4 or 5° leeway in the unrestrained position, and thus the attachment element 12 can be rotated to an approximately 65° orientation and all orientations between about 65° and 70°.)

In its lock-on orientation (see particularly FIGS. 4 through 6) the attachment element 12 is affixed to, or locked on, the male dovetail element 10. The attachment element 12 contacts the male dovetail member 20 substantially along the entire straight sections of the side edges 32, 34, and the attachment element's bearing or contact edges 48, 50 bear against the body face 22. The attachment element 12 essentially is jammed or wedged into the corners formed between the male dovetail member 20 and the body face 22. A clearance between the male dovetail member 20 and the remote edge 30 remains, but of course that does not influence the locked condition. The only motion, if any, of the attachment element 12 in the lock-on orientation would be due to the flexibility, if any, of the attachment element 12.

The attachment element 12 is also offset from a right angled or normal position relative to the body face 22 when in the lock-on orientation, but its orientation is closer to upright (in comparison to its release position). The angle between the planes of the attachment element 12 and body face 22 remain within a range of angles that arc greater than 0° but less than 90°, but the angle is now approximately 80°. The attachment element 12 cannot be upended to a position normal with the body face 22, and is sufficiently stiff or rigid to preclude rotation through such a normal position.

Referring now particularly to FIG. 7 also, there is shown the directions of positive force required to turn or translate the attachment element 12 from an unrestrained position to a locked position, and to release it from the locked position. Both locking the attachment element 12 on the male dovetail member 20, and releasing it from a locked position, typically only require a simple and quick push, which in many embodiments of the invention can be a simple and quick manual push. The attachment element 12 and the body face 22 on their "less than 90° angle" side define a wedge-shaped region 11. The direction of the locking force "A" on the attachment element is against the outlying material 14 of the attachment element 12 from within the wedge-shaped region 11. In other words, a force that will lock the attachment element 12 is one that will open or increase the angle between it and the body face 22. The direction of the release force "B" is the opposite, namely a force that will close or decrease the angle between the attachment element 12 and the body face 22. Also shown in diagrammatic form is an ancillary device 21 fastened and supported on the attachment element 12. The ancillary device 21 is secured to the attachment element 12 by conventional mechanical fasteners (not shown). Once the ancillary device 21 is mounted on the attachment element 12, the combination can be easily and quickly installed on the dovetail member 20, repositioned and removed as desired.

The attachment mechanism provided by the present invention is more effective and efficient, and typically less expensive, than conventional mechanical fasteners and other mounting means such as screws, bolts, clamps, magnets and the like. The present invention permits rapid installation, repositioning and removal and detachment of ancillary devices. The speed at which such steps can be accomplished with the present invention generally cannot be approached when conventional attachment means are used.

The present invention can be employed with a wide variety of dovetail structures. It can be employed with any protrusion or projection with opposed sides slanting and/or expanding outward from a body's surface, regardless of whether the profile of such sides is considered a conventional male dovetail. Such projection's opposite sides can flare out at complementary (mirror image) angles or different angles relative the associated body surface. The invention only requires that there be an angle between the facing surface and the attachment element at which (a) an edge of the attachment element bears against that facing surface and (b) an edge of the locking way bears against the outer side of a male dovetail projection or member. In many, and possibly most, embodiments there should be an angle between the facing surface and the attachment element at which (a) the attachment element bears against that facing surface on both sides of the male dovetail member and (b) edges of the locking way bear against both of the opposed outer sides of a male dovetail member. These typically substantially linear contact or bearing areas should be sufficient in length to hold the attachment element fast. The lock-on angle, that is, the angle (the smaller of the two angles) between the facing surface and the attachment element at which the attachment element is affixed to the male dovetail, can be any angle between about 0° and about 90° excluding of course both 0° angle and a 90° angle. Lock-on angles of from about 60° to about 85° are believed to provide the optimal locking action, and thus are preferred. The optimal locking action, or locking arrangement, provides a sufficient degree of locking or affixation without locking so completely or tightly that an undesirable degree of force is required to disengage the lock (release). Locking angles of greater than about 85° might lock the attachment element on the dovetail too tightly. Locking angles of less than about 60° might not provide an optimally secure lock-on. The unrestrained or release position will be an angle or within a range of angles that are less than the lock-on angle. An attachment element with a small lock-on angle will have even smaller release angles. Very small release angles could obstruct handling of the attachment element when being slid on the male dovetail. On the other hand, large lock-on angles (such as those approaching 90°) should not be used unless the attachment element is sufficiently rigid, given the load thereon, to avoid being rotated through the 90° position. In preferred embodiment, the attachment element is substantially rigid, with little to no flexibility under use loads.

In further description regarding the embodiment of FIGS. 1 through 7, that embodiment can be described as an attachment apparatus 9 comprising the male dovetail element 10 and the associated attachment element 12. The dovetail element 10 is comprised of the male dovetail member 20 extending outward from the face 22 of the body member 24 The attachment element defines the way 28, and the male dovetail member 20 extends substantially through the way 28. The attachment element 12 is movable from (a) a release orientation in which movement co-axially along the male dovetail element 10 is substantially unrestrained to (b) a locked orientation relative the male dovetail element 10. The male dovetail member 20 has two opposed outwardly slanting sides 54, 56. The way 28 is in part defined by the two opposed side edges 32, 34 which taper towards each other and conclude proximate the open way mouth 58. The way mouth 58 is defined and flanked by the spaced apart bearing edges 48, 50 of the attachment element 12. The side edges 32, 34 bear against the opposed sides 54, 56 of the male dovetail member 20 and the bearing edges 48, 50 bear against the body member face 22 when the attachment element 12 is in a locked orientation.

Further, the attachment element 12 in its locked orientation delineates a lock-on angle, the lock-on angle being an angle between the attachment element 12 and the body member face 22, and having an arc of more than about 0° and less than about 90°. The attachment element 12 in its release orientation is positioned at a release angle, the release angle also being an angle between the attachment element 12 and the body member face 22. The release angle is smaller than the lock-on angle. The attachment element 12 is moved from the locked orientation to the release orientation by force that decreases the angle between the attachment element 12 and the body member face 22.

The attachment element 12 can also be described as a structure that comprises a base portion or member 15 and a pair of spaced-apart arms 18, 19. The base member has a first side 16 and a second side 17 opposite said first side 16. The arms 18, 19 extend from the second side 17 of the base member 15. The arms 18, 19 each have a flat distal end, which flat distal ends are the bearing edges 48, 50 of the attachment element described above. The bearing edges 48, 50 are in substantial linear co-alignment. The arms also have substantially straight inner sides, which are the side edges 32, 34 described above that taper towards each other whereby the distance between the arms 18, 19 is less at their distal ends than at their proximal ends. At least the arms 18, 19 are substantially flat structures.

The present invention can employ attachment members of various dimensions and a wide variety of thicknesses. As discussed above for the relatively thin attachment element 12 of FIGS. 1 through 6, the bearing contacts in the lock-on orientation are made by edges 32, 34 along the locking way 28 and edges 48, 50 of the attachment element 12. If the attachment element 12 was significantly thicker, there would still be edge contact or bearing if there were no custom cutting of the sides between the attachment element's broad or planar surfaces 44, 46. The edges of a thick attachment element could of course be slanted or angled so as to present a wider bearing surface at the lock-on angle. A preferred thickness of the attachment element is a thickness less than about 10 percent of the width of the associated dovetail element. The width of the dovetail element for this purpose is considered its neck width, that is, the distance between its flared sides where it meets the associated facing surface, or in other words the shortest distance between its flared sides. It is nonetheless well within the average skill of a person in relevant technical fields, upon becoming conversant with, or otherwise having knowledge of, the present invention, to select suitable configurations and thickness for a given embodiment and use application.

The attachment element is preferably formed of sheet metal, including without limitation steel, aluminum and the like, but the invention is not limited to that material. Suitable materials include natural, synthetic and semi-synthetic materials, including without limitation wood, plastics, fiber/resin composites and the like. It is within the average skill of a person in relevant technical fields, upon becoming conversant with, or otherwise having knowledge of, the present invention, to select a suitable material for a given embodiment and use application.

In preferred embodiments, the attachment element will generally hold fast in a lock-on position in the absence of any significant external force acting upon it the embodiment shown in FIGS. 1 through 7 is within this self-sustaining hold-fast type of lock-on category.

When the attachment element extends down from a body, as now envisioned for many or even most embodiments, the weight of the attached or integral ancillary device will reinforce the lock-on position, but not be sufficient to move the attachment element into a fast lock-on position from a release position without external force. In such embodiments, generally preferred, the weight of the ancillary device cannot alone lock up the attachment element, and instead the attachment element will remain substantially in its release position until a positive external force is applied.

It is within the average skill of a person in relevant technical fields, upon becoming conversant with, or otherwise having knowledge of, the present invention, to make appropriate selections of materials and/or thicknesses and the like, for a given embodiment and use application.

The present invention in broad embodiments does not exclude, however, embodiments in which the weight of the ancillary device and/or other constant external forces are sufficient to urge the attachment element from a release position into a locked position. In such embodiments a countering external force would be required to hold the attachment element in the release position, for instance when that position is required for its manipulation.

The present invention in broad embodiments also does not exclude embodiments in which the lock-on action is considerably or solely due to a stop, detent or barrier effect. In such embodiments the attachment element is free to move from a lock-on orientation back to a unrestrained orientation unless there is a force or pressure opposing that movement. That force could be the weight of the ancillary device or other force, A quick release of the ancillary device is still provided in such embodiments. The release of the attachment element requires only a slightly overriding counter force.

A method in which the profile configuration of an attachment element is selected is exemplified as follows, with reference to the attachment element 12 and the male dovetail member 20 and body face 22 of FIGS. 1 through 7. The angle and the dimension comparisons here are made taking the attachment element 12 and the end profile of the male dovetail member 20 as they would be if laid out within the same plane. The angle formed between for instance the side edge 34 and the bearing edge 50 (referred to hereinafter as the "attachment-element profile angle" or "APA") is larger than the angle formed between the side of male dovetail member 20 and the body face 22 (referred to hereinafter as the "dovetail profile angle" or "DPA"). As noted above, the lock-on angle of this embodiment is about 80°. This is a relatively high lock-on angle. The lower the lock-on angle, the greater is the difference between the APA and DPA. In the embodiment of FIGS. 1 through 7, the DPA is about 50° and the APA is just slightly larger, that is, about 51°. This difference is small, but important. If an APA equal to the DPA was used, the only angle at which the edge 34 would have considerable contact with the male dovetail member 20 when the adjacent bearing edge 50 bears against the body face 22 is a 90° angle, that is, when the attachment element 12 is upright, at a 90° angle to the body face 22. Therefore if an APA equal to the DPA was used, there would be no locking action. (As noted above, the difference between the APA and the DPA is greater when the lock-on angle is lower. For instance, for a lower lock-on angle of about 50° on the same male dovetail member 20, which has a DPA of about 50°, an APA of about 61° would be needed.) The length of the side edge 34 as it would be in the absence of the corner clearance allowances 36, 40 (the angled distance between the way's mouth 58 and its remote edge 30), which is referred to hereinafter as the "SE", must be longer than the length of the adjacent dovetail side 54. (In other words, depth of the way 28 must greater than the height of the male dovetail member 20.) The minimum SE can be determined by standard geometry formulas from the known factors, that is, (a) where the desired lock-on angle is the 80° lock-on angle, the lowest release angle desired is about 10 or 15° less, or about 70°; (b) the male dovetail height is measured; and (c) the minimum length of the SEC will be the length of the longest side of a right triangle having a 70° angle. There is no maximum SE other than possibly that the SE should not be so great that steadiness or dimension stability between the attachment member arms 18, 19 is not overly undermined. Alternatively the dimensions required for the profile configuration of the attachment element 12 could be determined using a CAD computer program. For any given male dovetail profile, however, as long as the APA is less than the DPA, and the SE is sufficient to provide clearance, a lock-on angle will had and the combination will be operative. It is within the average skill of a person in relevant technical fields, upon becoming conversant with, or otherwise having knowledge of, the present invention, to determine the planar profile dimensions of a suitable attachment element for a given male dovetail for a given embodiment and use application, regardless of whether or not the lock-on angle is predetermined.

Referring to FIG. 8, various alternative features of the invention are shown. A split or bifurcated elongate male dovetail member 59 is comprised of two spaced-apart, non-symmetrical semi-dovetail projections 60, 61 and a body member 64. The semi-dovetail projections 60, 61 each extend or project upward from a face 62 of the body member 64. Locked onto the dovetail member 60 is an attachment element or article 66. The attachment element 66 is comprised of a pair of arms 68, 69 extending from a base member 70. Also extending from the base member 70 is a center filler piece 71 that reaches into the space between the semi-dovetail projections 60, 61. The pair of arms 68, 69 and the base member 70 define or form an open-mouthed or open-sided way 72. The way 72 is dissected by the filler piece 71 into a first and second way section 72a, 72b. The attachment element 66 is movable from a locked position, as shown, to a release or unrestrained position or orientation, in the same manner described above for the embodiment of FIGS. 1 through 7. The way 72 likewise can be considered a locking way 72.

As shown, the filler piece 71 does not bear against the face 62 nor the inner sides 74, 76 of the semi-dovetail projections 60. 61. In alternate embodiments the filler piece 71 can be formed so that it provides one or more bearing contact(s) with the body member face 62 and/or the inner sides 74, 76 of the semi-dovetail projections 60, 61. (As illustrated in FIG. 8, such an embodiment would require the filler piece 71 to be formed longer and wider.) The base member 70 of the attachment element 66 is itself an ancillary device or a section of an ancillary device. In other words, in this embodiment the base member 70 of the attachment element 66 is provided by the structure of an ancillary device. In this embodiment it is well seen that the base member 70 bridges the arms 68, 70 and joins them into a cooperating pair.

The way's side edges 78, 80 are the facing or inner side edges of the arms 68, 69. In the illustrated locked orientation, the way's side edges 78, 80 bear against the outer sides 78, 80 of the semi-dovetail projections 60, 61 and the distal ends 82, 82 of the attachment element's arms 68, 69 bear against the face 62 of the body member 64. There are no corner clearances. The side edges 78, 80 extend well beyond the outer sides 78, 80 of the semi-dovetail projections 60, 61. The arms 68, 69 can be formed as set components of the ancillary device comprising the base member 70 of the attachment element 66, or instead can be detachable and/or interchangeable components in otherwise conventional maimer. The semi-dovetail projections 60, 61 could also be detachable and/or interchangeable components of the dovetail element 59 in otherwise conventional manner.

The embodiment of FIG. 8 exemplifies a variety of alternatives. This embodiment illustrates that the orientation of a male dovetail member need not be downward, but also can be upward or any direction in between. This embodiment illustrates that the arms of the attachment element need not be formed of as integral parts of a single-piece structure, provided that they provide a cooperative pair having facing and distal edges or sides that bear against respectively the dovetail element and the adjacent body member surface in locking arrangement. This embodiment illustrates that the ancillary device can form a section of the attachment element, so long as structure is provided to bridge and thus join or unite the arms as a cooperative pair. This embodiment illustrates that the dovetail need not be formed of a unitary nor single protuberance or projection, provided that it furnishes a pair of slanting sides upon which the angled sides of a locking way (sides of the attachment element's arms) can be moved between (a) an unrestrained or release position and (b) a constrained or locked-on position.

An ancillary device can be any instrument, tool, structure or the like. For example, it could be a auxiliary light, or a shelf, or a mounting bracket for holding tools, a way cover (a cover for a guideway), or anything else that is not already conveniently located.

The ancillary device may be attached to an attachment element with conventional mechanical fasteners, such as screws, bolts and the like, or instead the ancillary device and attachment element can be formed as an integral unit. In other embodiments, the arms may be detachable from the base member, for instance providing a base member that can be combined with different pairs of arms to provide an assortment of way configurations. Among the combinations now envisioned are an ancillary device integrated with a base member, which can be outfitted with the arms appropriate for a given dovetail element, given the lock-up angle desired for a given application.

The above described embodiments are exemplitive, and the terminology is employed for illustration purposes and not limitation purposes. The present invention is not limited to the combinations and subcombinations illustrated herein.

I claim:

1. A quick locking and release attachment element comprising:
   a base member having a first side and a second side opposite said first side;
   a first and a second spaced-apart arm each extending from said second side of said base member;
   said first and second arms each having a distal end, said distal ends having bearing edges in substantial linear co-alignment;
   said first and second arms having substantially straight inner sides, wherein said inner sides taper towards each other whereby the distance between said first and second arms is less at their distal ends than at their proximal ends;
   an open-mouthed way defined by said first and second arms and said second side of said base member;
   said first and second arms having a flat, plate-like thinness; and
   wherein said first and second arms are detachable from said base member.

2. An attachment apparatus comprising:
   a dovetail extending outward from a face of a body member and an associated attachment element,
   wherein said attachment element defines a way,
   wherein said dovetail extends through said way,
   said dovetail having two opposed outwardly slanting sides,
   said attachment element having two opposed side edges tapering towards each other and concluding proximate an open way mouth flanked by spaced apart bearing edges, said side edges in part defining said way,
   said attachment element having a release orientation relative said dovetail in which said dovetail extends through said way, in which said side edges are substantially spaced apart from said opposed sides of said dovetail, in which said bearing edges are spaced apart from said body member face, and in which movement of said attachment element co-axially along said dovetail is substantially unrestrained;
   said attachment element having a locked orientation relative said dovetail in which said side edges bear against said opposed sides of said dovetail, in which said bearing edges bear against said body member face, and in which movement of said attachment element co-axially along said dovetail is restrained;
   wherein said attachment element is movable from said release orientation to said locked orientation by a first substantially pivotal motion of said attachment element relative said dovetail;
   wherein said attachment element is movable from said locked orientation to said release orientation by a second substantially pivotal motion of said attachment element relative said dovetail; and
   said first substantially pivotal motion is directionally opposite said second substantially pivotal motion.

3. The attachment apparatus of claim 2 wherein said attachment element is formed with two opposed sides lying in substantially parallel planes.

4. The attachment apparatus of claim 3 wherein the thickness of the attachment element is less than 10 percent of the width of said dovetail member.

5. The attachment apparatus of claim 2 wherein said attachment element in its locked orientation defines a lock-on angle, said lock-on angle being an angle between said attachment element and said body member face, and having an arc of more than about 0° and less than about 90°.

6. The attachment apparatus of claim 5 wherein said attachment element in its release orientation is positioned at a release angle, said release angle being an angle between said attachment element and said body member face, wherein said release angle is smaller than said lock-on angle.

7. The attachment apparatus of claim 5 wherein said attachment element is translatable from said locked orientation to said release orientation by a brief application of manual pressure on the attachment element.

8. The attachment apparatus of claim 5 wherein said lock-on angle is within the range of from about 60° to about 85°.

9. The attachment apparatus of claim 5 wherein said attachment element is comprised of a base member bridging a first and second arm member.

10. The attachment apparatus of claim 9 wherein said base member of said attachment element provides an attachment site for an ancillary device or is itself an ancillary device or a component of an ancillary device.

11. The attachment apparatus of claim 9 wherein said first and second arms are detachable from said base member.

12. An ancillary attachment assemblage comprising:
    a male dovetail element, an attachment element and an ancillary device;
    said male dovetail element comprising an elongate male dovetail member and a body member wherein said male dovetail member projects from a face of said body member said dovetail member having two opposed sides;

said attachment element comprising structure defining a way;

wherein said ancillary device is affixed on a section of said attachment element outlying said way;

said way having a remote edge and two opposed side edges;

said side edges each being substantially straight and obliquely inclined along oppositely slanting angles;

said attachment element having a pair of bearing edges disposed substantially adjacent the distal ends of said side edges;

said attachment element having at least one release orientation relative said dovetail element in which said dovetail member is disposed substantially within the embrace of said way, in which said side edges of said way are substantially spaced apart from said opposed sides of said dovetail member, in which said bearing edges are spaced apart from said face of said body member, and in which movement of said attachment element co-axially along said dovetail member is substantially unrestrained;

said attachment element having a lock-on orientation relative said dovetail element in which said side edges of said way bear against said opposed sides of said dovetail member, in which said bearing edges bear against said face of said body member, and in which movement of said attachment element co-axially along said dovetail member is restrained;

said attachment element being translatable between said release orientation and said lock-on orientation by a first substantially pivotal motion of said attachment element relative said dovetail;

wherein said attachment element is translatable from said lock-on orientation to said release orientation by a second and opposite substantially pivotal motion of said attachment element relative said dovetail;

wherein said lock-on orientation is a position whereat said attachment element forms a less than 90° angle with said body member face, and wherein said release orientation is a position whereat said attachment element forms an angle with said body member face that is less than said lock-on angle.

13. The ancillary attachment assemblage of claim 12 wherein said side edges of said way are side edges of a first and a second arm that each extend from a base member.

14. The ancillary attachment assemblage of claim 12 wherein said attachment element is translatable from said locked orientation to said release orientation by a brief application of manual pressure on the attachment element.

15. The ancillary attachment assemblage of claim 12 wherein said lock-on orientation is a position at an angle within the range of from about 60° to about 85°.

* * * * *